United States Patent
Basso et al.

(10) Patent No.: US 7,260,096 B2
(45) Date of Patent: Aug. 21, 2007

(54) METHOD AND ROUTER FOR FORWARDING INTERNET DATA PACKETS

(75) Inventors: Claude Basso, Raleigh, NC (US); Max Robert Povse, Apex, NC (US); Natarajan Vaidhyanathan, Greensboro, NC (US); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1085 days.

(21) Appl. No.: 10/191,657

(22) Filed: Jul. 9, 2002

(65) Prior Publication Data

US 2004/0008675 A1 Jan. 15, 2004

(51) Int. Cl.
*H04L 12/28* (2006.01)
(52) U.S. Cl. .............. 370/392; 370/395.71; 370/400; 711/217; 711/220
(58) Field of Classification Search ............ 370/395.7, 370/395.71, 395.72, 429; 709/242; 711/217
See application file for complete search history.

(56) References Cited

U.S. PATENT DOCUMENTS

| | | | | |
|---|---|---|---|---|
| 5,233,604 | A | 8/1993 | Ahmadi et al. | 370/60 |
| 5,761,440 | A * | 6/1998 | De Marco et al. | 370/392 |
| 5,787,255 | A | 7/1998 | Parlan et al. | 395/200.63 |
| 6,038,233 | A | 3/2000 | Hamamoto et al. | 370/401 |
| 6,055,561 | A | 4/2000 | Feldman et al. | 709/200 |
| 6,118,784 | A | 9/2000 | Tsuchiya et al. | 370/401 |
| 6,157,644 | A | 12/2000 | Bernstein et al. | 370/392 |
| 6,172,927 | B1 | 1/2001 | Taylor | 365/219 |
| 6,189,044 | B1 | 2/2001 | Thomson et al. | 709/242 |
| 6,272,132 | B1 | 8/2001 | Ofek et al. | 370/389 |
| 6,335,873 | B1 | 1/2002 | Kawaguchi et al. | 365/63 |
| 6,434,144 | B1 * | 8/2002 | Romanov | 370/392 |
| 6,526,056 | B1 * | 2/2003 | Rekhter et al. | 370/392 |
| 6,985,483 | B2 * | 1/2006 | Mehrotra et al. | 370/389 |
| 2002/0172203 | A1 * | 11/2002 | Ji et al. | 370/392 |

OTHER PUBLICATIONS

Y-C Liu et al. "Fast IP Table Lookup and Memory Reduction," *IEEE*, 2001, pp. 228-232.
"New caching scheme for routing table lookups," *IBM Research Disclosure*, Aug. 2001, p. 1378.
"Light Reading—The Global Site for Optical Network," via Internet at wysiwyg://54/http://www.lightreading.com/document.asp?doc_id =4009&page_number=5, pp. 1-2.

\* cited by examiner

*Primary Examiner*—Doris H. To
*Assistant Examiner*—Ian N. Moore
(74) *Attorney, Agent, or Firm*—Winstead PC

(57) ABSTRACT

The Internet data defining destinations accessible by a router are partitioned into a portion containing the address search information and a portion containing forwarding option data. The address search information is stored in fast memory in a tree search format and the set of possible next destinations are stored as forwarding option data in slower memory at addresses derived algorithmically from the tree search address information. Internet data packets are received and data therein is compared to determine the best match address in the fast memory to the set of possible best next destinations. The multiple accesses necessary to determine the best match address are confined to high speed memory. An algorithm receives option data from an Internet packet and option threshold data from the best match address of the high speed memory and determines which address of the slower memory has the desired forwarding data using one access.

21 Claims, 10 Drawing Sheets

SRAM DATA

| FIELD | Size in bits | Comments |
|---|---|---|
| Start of Hwd./cont. use field | | |
| Reserved | 2 | Valid Leaf Flag, Address Translation Flag. Not for use by the forwarding threads |
| Prefix length | 6 | field used by hardware for search purposes |
| Pattern | 32 | field used by hardware for search purposes |
| Start of software use fields | | |
| BGP Action Flag | 1 | Indicates entry is a BGP address |
| Ing_Eq_Egr_Node Flag | 1 | Ingress Equals Egress Node flag |
| LV Flag | 1 | Local cache Valid Flag |
| Reserved | 13 | Reserved bits to make field modulo 2 |
| ECMP thresholds | 16 | Equal cost Multi-path Thresholds |
| Total | 72 | Total width of SRAM portion of leaf |

FIG. 2

DRAM DATA A/B/C BANKS

| Field | Size (bytes) | Comment |
|---|---|---|
| Next Hop | 4 | IP@ or LSP Token |
| TB/TP | 2 | Target Blade/Target Port |
| Action Flags | 2 | Forwarding Action Flags |
| Egress Context | 2 | Only 12 bits are valid |
| Counter.skip+counter.csi | 3 | Cntr skip flag+Cntr Set Index |
| insertBottomLabel+bottonLabel | 3 | MPLS insert flag+bottom label |
| Total | 16 | |

FIG. 3

DRAM DATA D BANK

| Field | Size (bytes) | Comment |
|---|---|---|
| BGP NH | 4 | IP Address of BGP Next Hop |
| Next Lookup Table ID | 2 | LPM Tree ID |
| Signature | 1 | signature field |
| Reserved | 1 | unused/spare byte |
| Counter.skip+counter.csi | 3 | Cntr skip flag+Cntr Set Index |
| insertBottomLabel+bottonLabel | 3 | MPLS insert flag+bottom label |
| Total | 16 | |

FIG. 4

METHOD AND ROUTER FOR FORWARDING INTERNET DATA PACKETS

TECHNICAL FIELD

The present invention relates in general to methods and apparatus for forwarding Internet data packets at high speeds.

BACKGROUND INFORMATION

In networking, Layer 3 refers to the communications protocol that contains the logical address of a client or server station. It is called the "network layer" and contains the address (IP, IPX, etc.) inspected by a router that forwards it through the network. Layer 3 contains a type field so that traffic can be prioritized and forwarded based on message type as well as network destination. Since Layer 3 provides more filtering capabilities, it also adds more overhead than Layer 2 processing.

A Layer 3 switch is a network device that forwards traffic based on Layer 3 information at very high speeds. Traditionally, routers, which inspect Layer 3, have been considerably slower than Layer 2 switches. In order to increase routing speeds, many "cut-through" techniques have been used, which perform an "inspect the first packet at Layer 3 and send the rest at Layer 2" type of processing. Ipsilon's IP Switch and Cabletron's SecureFast switches were pioneers in cut-through switching; however, the MultiProtocol Label Switching (MPLS) protocol is expected to standardize this technique. MPLS is an Internet Engineering Task Force (IETF) standard for routing packets over the Internet.

The more deeply a packet is examined, the more forwarding decisions can be made based upon type of traffic, quality of service and so on. To get to this information means digging into the packet's headers to ferret out the data, which takes processing time.

The Layer 3 network layer establishes the route between the sending and receiving stations. The node to node function of the data link layer (Layer 2) is extended across the entire Internetwork, because a routable protocol contains a network address in addition to a station address. This layer is the switching function of the dial-up telephone system as well as the functions performed by routable protocols such as IP, IPX, SNA and AppleTalk. If all stations are contained within a single network segment, then the routing capability in this layer is not required. Internet hosts use routing tables to compute the Next Hop for an Internet data packet.

As more routing lookup functions were moved from software into the ASIC chips, Layer 3 switches could inspect each packet just like a router at high speed without using proprietary cut-through methods. If a Layer 3 switch supports packet-by-packet inspection and supports routing protocols, it is called a "routing switch" or "switch router," which simply means "fast router." For example, Cisco, Inc. calls its high-end routers Gigabit Switch Routers.

An Internet Protocol Version 4 (IPv4) routing table comprises a set of routes, which is updated by routing protocols such as Routing Information Protocol (RIP) or Open Shortest Path First (OSPF). Each route determines the outgoing interface for a set of IP destination addresses, which is represented by an IP address and a subnet mask. Both the IPv4 addresses and the subnet masks are 32-bit numbers.

Routing tables can take many forms. The following is a simple model that can explain most Internet routing. Each entry in a routing table has at least two fields, IP Address Prefix and Next Hop. The Next Hop is the IP address of another host or router that is directly reachable via an Ethernet, serial link, or some other physical connection. The IP Address Prefix specifies a set of destinations for which the routing entry is valid. In order to be in this set, the beginning of the destination IP address must match the IP Address Prefix, which can have from 0 to 32 significant bits. For example, all IP Address Prefix of 128.8.0.0/16 would match any IP Destination Address of the form 128.8.X.X. The syntax "128.8.0.0" represents four 8-bit bytes where the value of each byte is written in decimal form.

If no routing table entries match a packet's Destination Address, the packet is discarded as undeliverable (possibly with a notification to the sender). If multiple routing table entries match, the longest (prefix) match is preferred. The longest match is the entry with the most 1 bits in its Routing Mask.

To avoid needing routing entries for every possible Internet destination, most hosts and routers use a default route (some routing tables contain nothing but a single default route). A default route has a Routing Address/Mask pair of 0.0.0.0/0.0.0.0. In other words, it matches every IP address, but since there are no 1 bits in its Routing Mask, any other match would be selected by the longest match rule. The default route will only be used if there are no other matches in the routing table, thus its name. Default routes are quite common, and are put to best use on networks with only a single link connecting to the global Internet. On such a network, routing tables will have entries for local nets and sub-nets, as well as a single default route leading to the outbound link. However, remember that all Next Hops must be directly reachable, so the default routes won't necessarily point to the same IP address. Also, some networks (large Internet service providers, mostly) use default free routing tables that must be able to match every IP address in the global net.

A router uses the destination address of every incoming packet to decide the proper Next Hop information of the packet. High-speed routers are required to make these decisions at speeds of several million packets per second. Each search finds the longest prefix match of the destination address among all stored prefixes in the router.

An essential task of a router is to find out the outgoing interface of each incoming packet by querying its routing table, which may consist of more than 30.000 entries in a typical Internet backbone router. In the near future, the number of entries is expected to increase by almost an order of magnitude. In today's high end routers, routing table lookup is the performance bottleneck even though the system back plane (or switch fabric) is running at several times the lookup speed. To remove the bottleneck of table lookup a high-performance router is required to perform IP routing table lookup at the speed of the routers back plane throughput, which is translated into more than 4 million lookups per second for a 2 Gigabit per second backplane.

OC(Optical Carrier)48 defines transmission speeds of the SONET specification as 2488.32 Mbps. The newer OC192 specification increases these transmission speeds to 9953.28 Mbps. As speeds on the Internet move to the speeds of OC192 from OC48, it becomes more difficult to do the table lookups in the router at transmission speeds without resorting to higher speed memory (e.g., changing from DRAM to SRAM). As stated earlier, the router forwarding tables are getting increasingly large, therefore, to store all the routing information in high speed memory would add cost to the routers. The memory size may be reduced by using compression techniques and by finding ways to decrease the amount of data store without reducing performance of the high speed routers.

Associated with this increase from OC48 to OC192 speeds are new requirements resulting from the hardware design constraint of being able to access a given DRAM bank only once per frame. Given that a Longest Prefix Match (LPM) tree search may require two memory accesses, one read to obtain the pattern contained in the forwarding data for the "compare at end" operation and a second read to back track to the previous node (sometimes called the "bird") if the compare fails, normal OC48 operation cannot directly scale to the higher OC192 speeds and still maintain wire speed.

This single, simple requirement of maintaining wire speed for Layer 3 forwarding forces a redesign of the Layer 3 data structures to fit into the Tree Search Engine (TSE) memory access budget. To solve this problem, one may take the obvious step of moving to faster memory (e.g. SRAM). However, very fast SRAM requires an unrealistically large amount of memory and is too costly in terms of board real-estate, system power and overall product cost.

There is, therefore, a need for a method and device to improve the performance of the table look-up in high speed routers while minimizing cost.

SUMMARY OF THE INVENTION

The existing Layer 3 tree search data structure is partitioned into two parts henceforth referred to as the SRAM portion and the DRAM portion. The hardware information required to locate the forwarding data is stored in SRAM. The higher speeds of SRAM memory allow for multiple accesses even within the tight cycle budgets of OC 192 line rates. Most of the software required information, i.e. actual forwarding data used to manage the flow of the frame through the network processor, is stored in DRAM. However, to improve on the efficiency of accessing DRAM, a portion of the software required for the forwarding information is also moved to SRAM.

To further reduce the width of the SRAM, a new compact tree search data format is used which minimizes the space required by the pattern data. To optimize performance, the DRAM address is determined from the SRAM address without pointers by using a simple add offset/constant value. By calculating the DRAM address from the SRAM address along with the improved fast path read interface to the Tree Search Engine (TSE), the forwarding software (picocode) is able to quickly generate and initiate a single read operation to fetch the forwarding data stored in the DRAM.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 is a table showing details of the SRAM portion of the logical data;

FIG. 3 is a table showing the details of the A, B, and C banks of the DRAM portion of the logical data;

FIG. 4 is a table showing the details of the D bank of the DRAM portion of the logical data;

DETAILED DESCRIPTION

Figure 1:
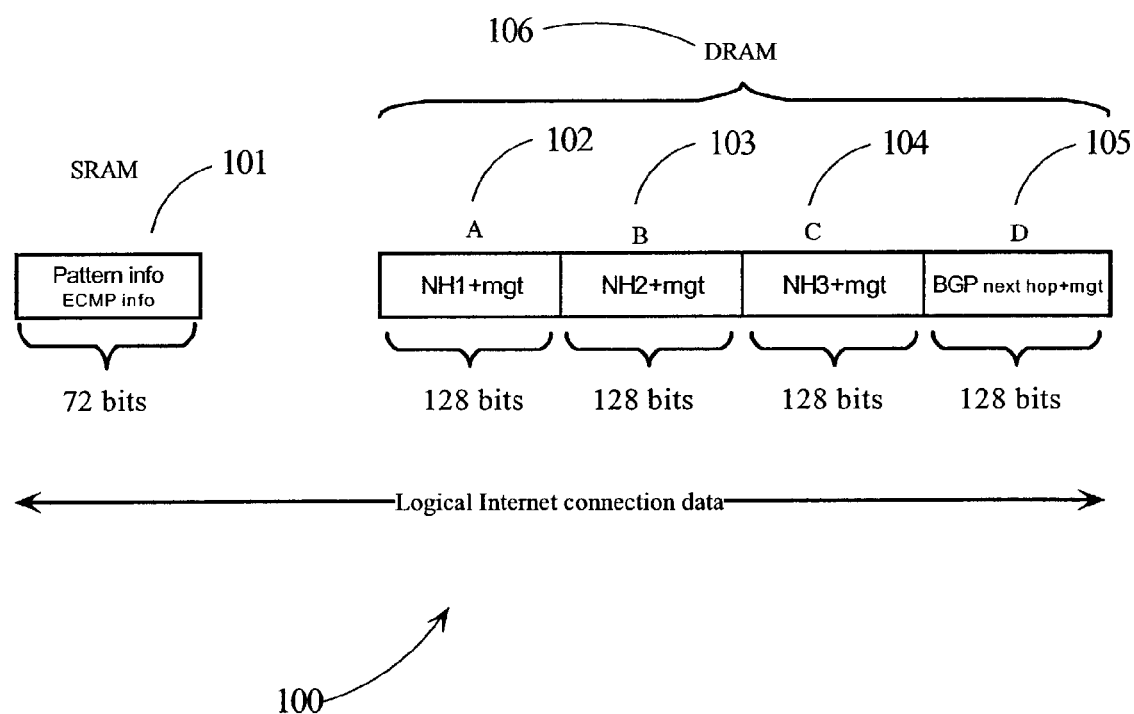
FIG. 1 is a diagram showing the partition of the SRAM and DRAM portions of the logical data.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The Internet uses IPv4 Protocol addressing. IPv4 addresses are 32 bits long and are written in the following byte format. The Ipv4 address is written as "x.x.x.x" where each "x" represents the decimal value of an 8 bit binary byte of the address. IPv4 addresses range from 1.0.0.0 to 223.255.255.255. Addresses 0.0.0.0 to 0.255.255.255 and 224.0.0.0 to 255.255.255.255 have "special" uses not discussed in this disclosure. The IPv4 address format comprises an address and a subnet mask. For example, if an Internet address is 12.34.56.78 the mask will indicate the number of the bits in the address that are network bits with the remaining bits as host bits. The network bits define the Internet connections accessing various physical networks. The physical networks connect a number of host systems and also may connect to additional routers. For example, an organization may have a large physical network (e.g., Ethernet) that connects all the systems within the organization. This organization's physical network may have one set of network bits that direct data to the organization's physical network. From that point the Host bits direct the data to the particular system which is the final destination. Multiple routers may be connected to a particular physical network so that a final destination may be reached via multiple Internet network paths. The routing tables stored in a particular router define those Internet network paths accessible by the router at a particular time.

If 24 bits of the IPv4 address are network bits, the above Internet address may be written as 12.34.56.78/ 255.255.255.0 with the bold numbers representing the mask. "255" indicates that all the bits in a corresponding 8 bit byte are part of the network bits. The three consecutive "255" make up 3 bytes or the 24 bits. This IPv4 address may also be written as 12.34.56.78/24. In this example, only the first 24 bits are network bits. The 24 bit mask therefore indicates the maximum number of bits that need to be examined to determine if a particular network connection will direct a received Internet data packet towards its final destination.

For example a router may be connected to a physical network which then connects all hosts with the 24 bit destination address prefix 12.34.56.78. The Internet router can do no more in getting a data packet to its final destination at this point, it is up to the physical network to do the final delivery using the Host portion of the destination address. Network connections that will direct Internet data towards final destinations that have prefixes of 12.x.x.x, 12.34.x.x, 12.34.56.x all will direct the particular Internet data packet with destination address prefix 12.34.56.78 towards its final destination. However, in this example the network connection that directs Internet data towards final destinations with the prefix of 12.34.56.x has the "longest prefix match" and may be the best Next Hop for the particular final destination prefix 12.34.56.78/24.

Figure 10:
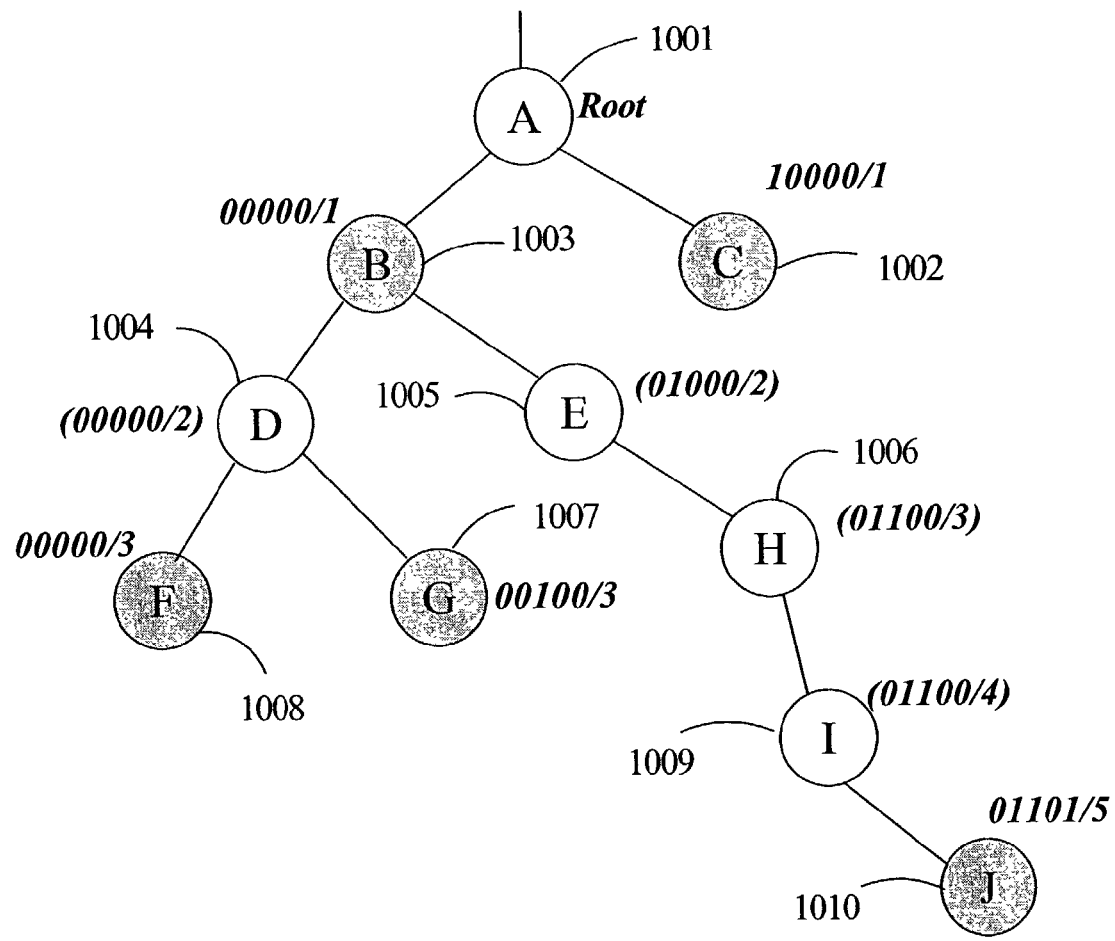
FIG. 10 is a diagram illustrating prefixes stored in a tree structure.

FIG. 10 illustrates an example of a simple tree structure for storing a set of five bit prefixes. The syntax is "xxxxx/y" or "prefix/length". The "x's" represent binary bits (prefix) and "y" indicates how many bits (length) of the prefix are used. For example, "11111/4" is an all ones prefix where only the first foul bits are valid (used). In the example of FIG. 10, the prefixes 10000/1, 00000/1, 00000/3, 00100/3, 01101/5 are to be stored in a tree format. The root A 1001 is the beginning and indicates that all five bit prefixes proceed from this point. If the first bit of the five bit prefix is a one, a branch is taken to C 1002. If the first bit is a zero, a branch is taken to B 1003. In this example, there is only one prefix (10000/1) which has a one as a valid first bit, therefore it is stored at C 1002. Since there is no other prefix with a first bit of one, C 1002 is referred to as a "leaf" of the tree structure. All prefixes with a first bit of one would proceed through C 1002. All prefixes with a first bit of zero proceed to B 1003. Prefix 00000/1 is therefore stored at B 1003. Prefix 00000/3 also has a first bit of zero and therefore it proceeds through B 1003. From B 1003 branches are taken depending on whether the second bit is a one or a zero. If the second bit is a one the branch to E 1005 is taken and if it is a zero the branch to D 1004 is taken. None of the five prefixes given terminate at E 1005 or D 1004 as they all have more than two valid bits. From D 1004 branches are again taken based on the next (third) bit of the prefix. In this case, if the third bit is a one the branch is taken to G 1007 where prefix 00100/3 is stored. If the third bit is a zero the branch is taken to F 1008 where prefix 00000/3 is stored. The last prefix 01101/5 has five valid bits and proceeds through E 1005 since the first two bits are 01. If the third bit is a one a branch is taken to H 1006. Since there is no prefix with only three valid bits of 011, no prefix is stored at H 1006. If the fourth bit is a zero in this path, then a branch is taken to I 1009. All prefixes with the four valid bits of 0110 proceed through I 1009. If the fifth bit is a one in this path, a branch is taken to J 1010 where prefix 01101/5 is stored. Again, J 1010 is a leaf of the tree 1000. The prefixes in parenthesis at D 1004, E 1005, H 1006, and I 1009 indicate prefixes that would be stored at these locations if they existed. F 1008, G 1007 and J 1010 are considered leaf nodes because no branches are taken from these nodes. While a prefix is stored at B 1003, node B 1003 is not a leaf node because branches are taken to intermediate nodes D 1004 and E 1005 from B 1003.

This example illustrates how a tree structure works. Methods exist in the arts on how to construct and how to search tree structures. The important point is that, depending on the prefix and length, one can find a stored prefix and access the data stored therein.

Routing on the Internet means finding a communication path. The paths or directions are derived from Internet connection data received from a routing protocol. Several alternative paths may exist when exiting one router and going to the next router or physical network (Next Hop) and option data describing the characteristics of the alternate paths is updated periodically or as the Internet connections change. The option data is based on topology, policies and metrics (Hop count, filtering, delay, bandwidth, etc.)

The Internet connection data stored in router tables is organized in a tree structure. The Internet connection data is sent to the routers and they build "maps" and determine "directions" for forwarding Internet data packets over the Internet network. The router forwards Internet data packets by moving the packets between interfaces according to the "directions". The directions are in the form of Next Hop options that will move the Internet data packet towards a final destination based on how many of the bits in the packet's destination address matches the prefixes stored in the router tables.

The router table tree structure is searched for the "longest" prefix that matches a corresponding number of bits in the destination address of the received Internet data packet. When the longest prefix match is found, there may be more than one Next Hop connection (direction) that will move the Internet data packet towards its final destination. Picking which optional Next Hop to take is done based on data describing the "quality of service" requirement of the received Internet data packet and parameters describing a particular optional Next Hop's service characteristics. An algorithm (e.g., an Equal Cost Multi-Path) takes this data and decides which of the Next Hop options to take for the particular received Internet data packet.

The following describes in more detail how embodiments of the present invention are used to organize and store the router table data so that the search and selection of a Next Hop option can be done at the transmission speed of the Internet data packets while minimizing cost, power requirements and size of an Internet router.

FIG. 1 is a block diagram illustrating the bits that may be stored as pail of the Internet data defining the Internet connections accessible with a particular router. Logical Internet connection data 100 describes data that is normally stored in the router to define the connections accessible by the router. The logical Internet connection data 100 includes Pattern and Equal Cost Multi-Path information (72 bits), three Next Hop addresses along with management data (128 bits each), and a Border Gateway Protocol (BGP) Next Hop data along with its management data (128 bits). Embodiments of the present invention partition this data as shown in FIG. 1 so that the Pattern and ECMP information is stored in static random access memory (SRAM) 101. Next Hop one (NH1), NH2, NH3 and BGP are stored in dynamic random access memory (DRAM) Banks A 102, B 103, C 104 and D 105, respectively.

FIG. 2 is a table that lists the details of what is contained in the Pattern and ECMP data. The hardware (Tree Search Engine) that is searching the tables stored in the SRAM 101 uses the Prefix length field of 6 bits and the Pattern field of 32 bits. The remaining bits are used by the software algorithm to calculate the address in DRAM 106 that is accessed when a particular entry in the SRAM 101 is determined to be the LPM.

FIG. 3 illustrates the data stored in DRAM banks A 102, B 103 and C 104. Each of these banks represents one of the three potential Next Hop structures. The selection of which Next Hop to choose is made after execution of the ECMP algorithm. The thresholds used as inputs to the ECMP algorithm are obtained from the last two bytes of the SRAM 101 portion of the forwarding data as shown in FIG. 2. By partitioning the data to put these thresholds in the SRAM 101, the ECMP algorithm is applied before the DRAM 106 portion of the data needs to be accessed. This allows for an improvement in bandwidth allocation to the DRAM 106 memory by accessing fewer banks on a per frame basis (Internet data packet is a frame).

FIG. 4 is a block diagram illustrating the data stored in the bank D of DRAM 106. The bank D 105 contains the BGP Next Hop information along with overall data management parameters.

Figure 5:
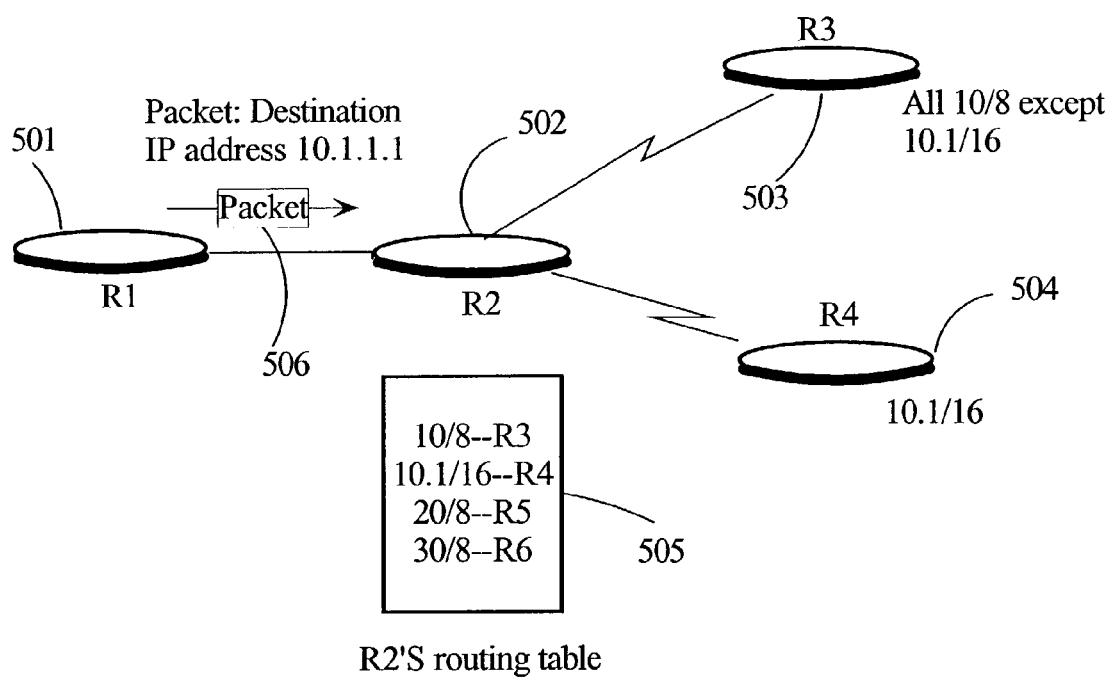
FIG. 5 is another diagram illustrating routing an Internet data packet using a longest prefix match.

FIG. 5 is a diagram illustrating the connection between four routers, R1 501, R2 502, R3 503 and R4 504. Router R1 501 is forwarding an Internet data packet 506 to router R2 502 and has a destination IP address of 10.1.1.1. Router R2 502 has Internet connection data stored in its routing table 505. Routing table 505 indicates that Internet data packets with a prefix of 8 bits matching the decimal number 10 (binary 00001010) are forwarded to router R3 503 if this is the longest prefix match. Likewise 16 bit prefixes matching 10.1 are forwarded to router R4 504. Prefixes with 8 bits matching 20 are forwarded to router R5 (not shown) and 8 bits matching 30 are forwarded to router R6 (also not shown). The received Internet data packet 506 has prefix bits that match both R3 503 and R4 504, however, R4 504 is the longest prefix match since the first 16 bits of the prefix match. Router R2 502 would pick router R4 as the best Next Hop for Internet data packet 506.

Figure 6:
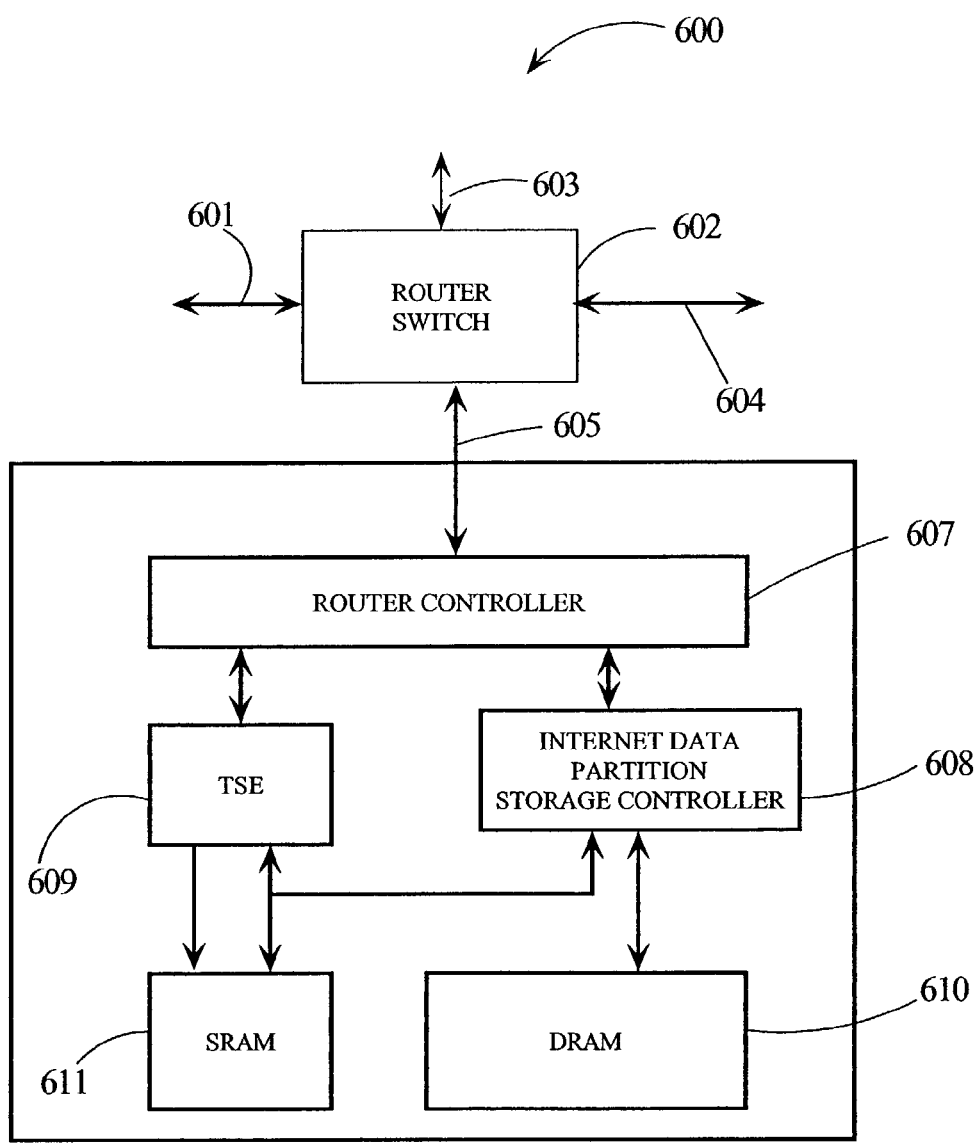
FIG. 6 is a block diagram of an Internet router according to embodiments of the present invention.

FIG. 6 is a block diagram of elements within a Internet router 600 according to embodiments of the present invention. Router switch 602 is used to allow Internet data packet received on ports 601, 603 and 604 to be forwarded to a next hop destination that best meets the requirements of the Internet data packet. Router controller 607 receives Internet connection data describing which Next Hop destinations are accessible on a given port. The Internet connection data is updated periodically as connection configuration changes. This Internet connection data is stored in the Internet router 600 and is searched when an Internet data packet is received to find the best Next Hop destination for the data packet that fits its quality of service specifications.

In embodiments of the present invention, the Internet data is partitioned by Internet partition controller 608 into data that is searched with tree search engine (TSE) 609 and data that defines a set of Next Hop destination options. The data to be searched is the set of destination addresses that are accessible via a given port or Internet connection accessible by a particular router (e.g., router 600). For example, connection 604 may be connected to another router that in turn has access to connections that lead to sets of final destinations. Because of the complexity of the Internet that may be many routes from a give router to a final destination, however, they may not all have the same quality of service capabilities. Therefore for a given set of accessible final destinations there may be multiple connections that can reach the destination. These are the Next Hop options that are stored which define possible Next Hops that may be used.

The searchable data is stored in fast SRAM 611 memory as it may take multiple reads to determine which connection option best fits a particular received Internet data packet. Option thresholds are stored at the searchable addresses. The Next Hop options that are used to determine where to forward the Internet data packet are stored in slower DRAM 610. The DRAM 610 is partition into memory banks with each bank storing the data for a particular Next Hop option. The DRAM 610 storage address is calculated with an ECMP algorithm that determines the DRAM 610 address from a corresponding SRAM 611 searchable address and the option threshold data stored therein at the SRAM 611 address locations. In this manner, DRAM 610 has to be read only once as the desired address is determined by reads of the fast SRAM and calculations of the ECMP algorithm.

When router 600 receives an Internet data packet, it is examined in Internet controller 607 for its destination address data and its quality of service criteria which in turn is used to determine which of the possible Next Hops is the best fit. TSE 609 searches the stored data in SRAM 611 and determines which of the connection options has the longest prefix match with the received destination address of the Internet data packet. This may take two reads of SRAM 611. When the match is made, the DRAM 610 address and a corresponding memory bank is calculated by the ECMP algorithm using the stored option threshold data and the quality of service data in the Internet data packet. DRAM 610 is then read only once to return data for forwarding the Internet data packet. Router controller 607 then directs router switch 602 via 605 to forward the Internet data packet to the Next Hop destination address read from DRAM 610.

Figure 7:
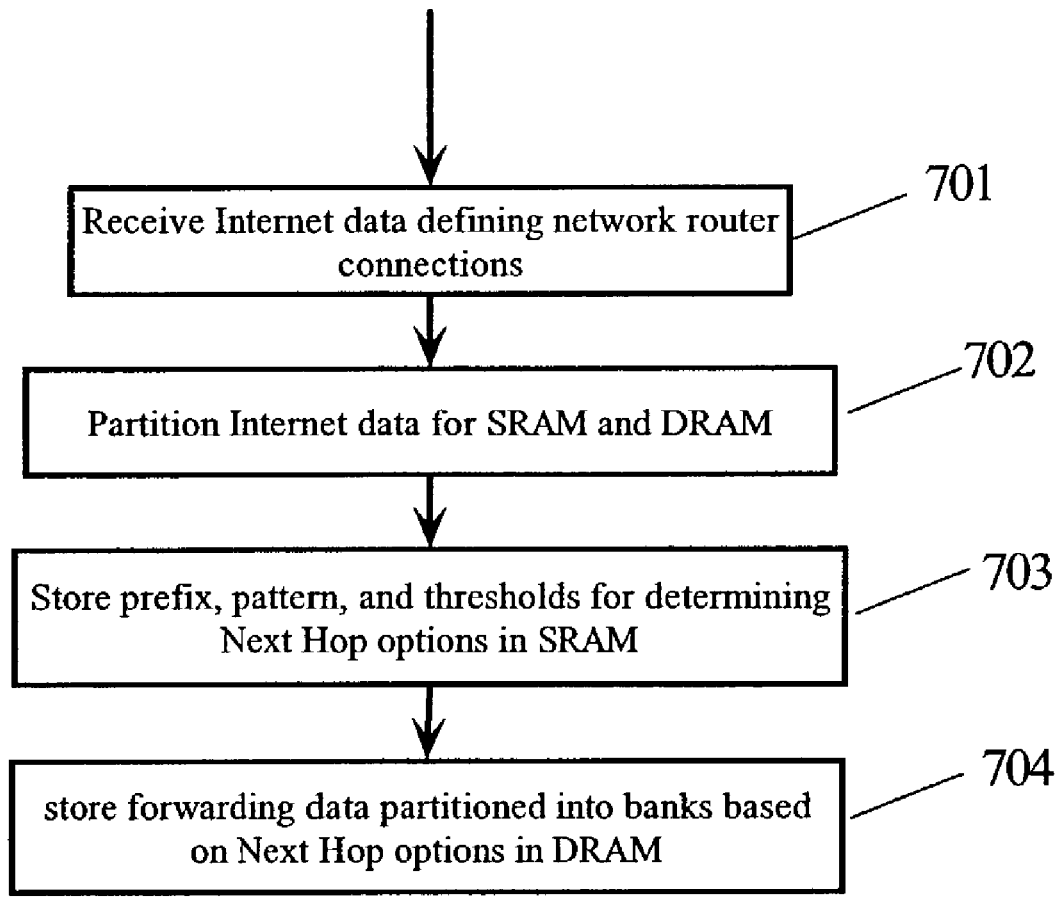
FIG. 7 is a flow diagram of method steps used in embodiments of the present invention.

FIG. 7 is a flow diagram of method steps used in embodiments of the present invention. In step 701 Internet data defining network router connections is received in the router 600. In step 702, controller 608 partitions the Internet data into a search partition comprising Prefix data, Pattern data and ECMP threshold data and a forwarding data portion comprising Next Hop options. In step 703, the search partition is stored in a tree search format in SRAM 611. In step 703, DRAM addresses are calculated from the SRAM address. In step 704, the forwarding data portion comprising the Next Hop options are stored in memory banks at addresses determined algorithmically from the SRAM address.

Figure 8:
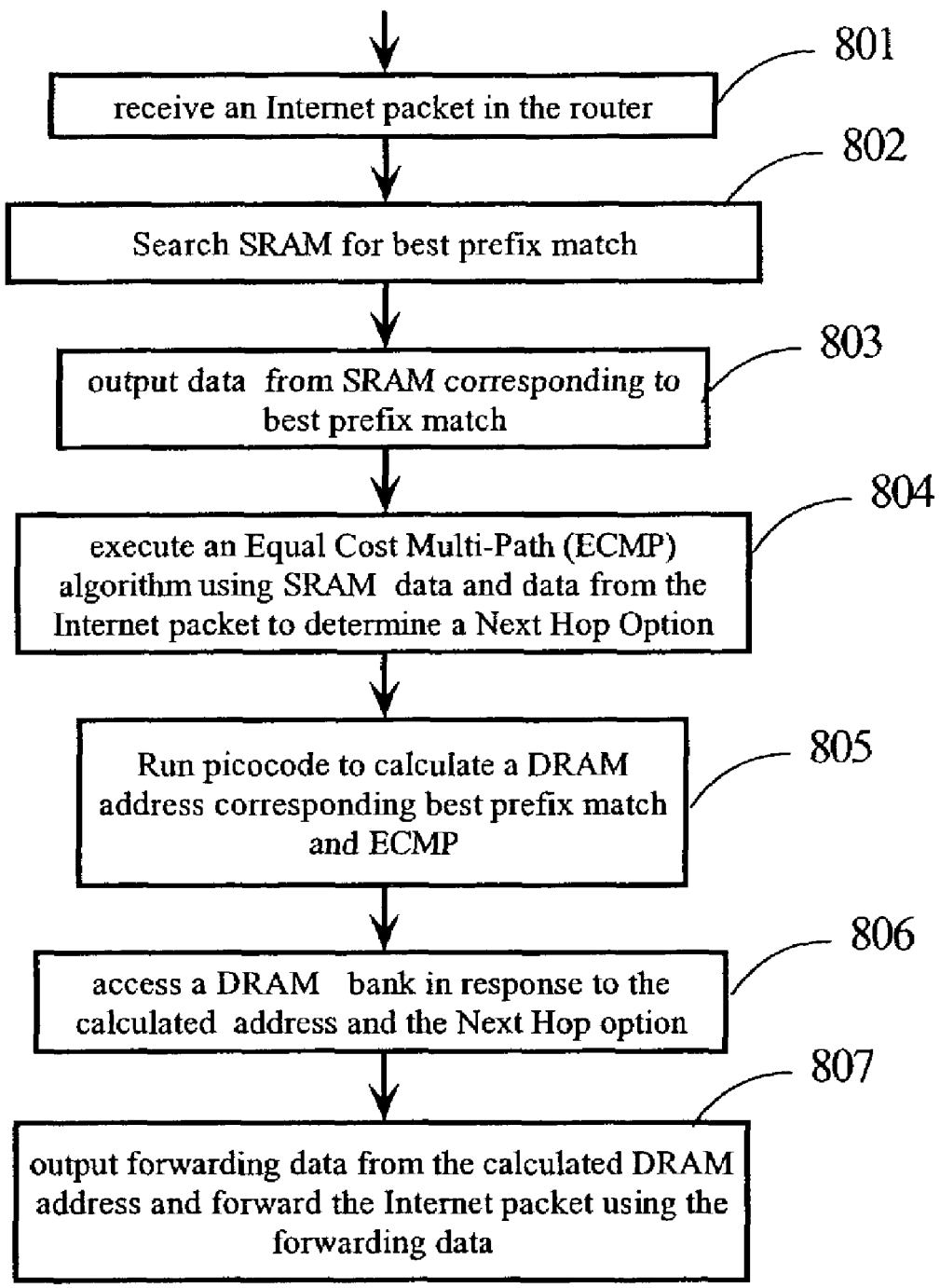
FIG. 8 is a flow diagram of method steps used in embodiments of the present invention.

FIG. 8 is a flow diagram of method steps used in embodiments of the present invention. In step 801, an Internet data packet is received in router 600. In step 802, router 600 uses Tree Search Engine (TSE) 609 to search SRAM 611 to determine the longest prefix match stored in the tables of SRAM 611. In step 803, data stored at the matched SRAM 611 location is outputted and provided to step 804 where an ECMP algorithm is run using the threshold data and quality of service data from within the Internet data packet. In step 805, the DRAM address is calculated algorithmically from the SRAM 611 address and the results of the ECMP algorithm of step 804. This is used to determine which particular DRAM 610 bank is accessed in step 806 to output the best Next Hop destination based on results from the ECMP algorithm. DRAM 610 is accessed in step 806 using the generated addresses and the Next Hop forwarding data is outputted. In step 807, the forwarding data is used in the router controller 607 to make the correct connection for the received Internet data packet.

Figure 9:
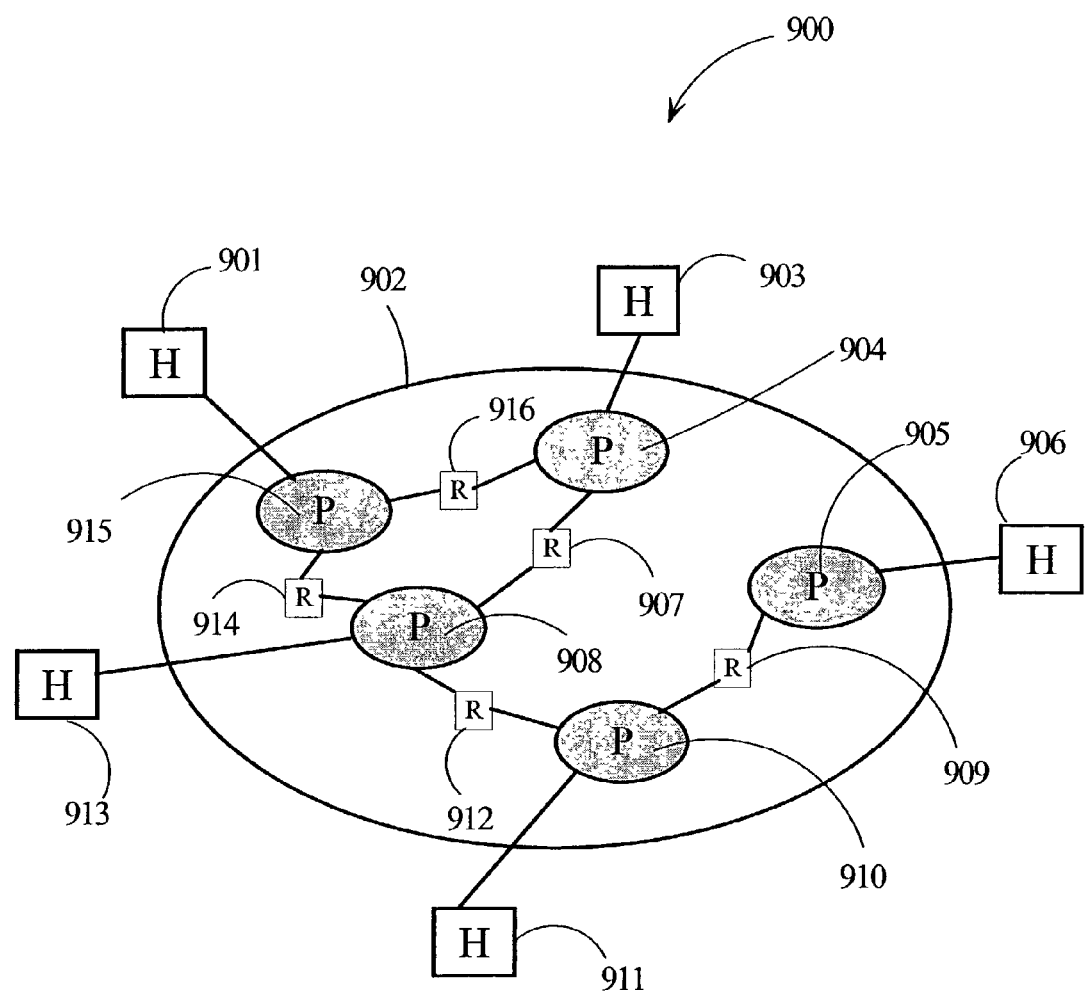
FIG. 9 is a block diagram of an Internetwork illustrating Internet connections.

FIG. 9 is a block diagram of an Internetwork 900 illustrating Internet connections. Internet 902 encompasses all of the physical networks P 904, P 905. P 908, P 910 and P 915 and the routers R 907, R 909, R 912, R 914, and R 916. The Hosts H 901, H 903, H 906, H 911, and H 913 communicate over the Internet 902 by sending data which gets forwarded by the routers R 907, R 909, R 912, R 914, and R 916 via the physical networks P 904, P 905, P 908, P 910 and P 915. One can see that may routes are possible from any one Host to any other Host by traversing the physical networks and the routers. All routes are not equal in the directness of path.

Although the present invention and its advantages have been described in detail, it should be understood that various changes, substitutions and alterations can be made herein without departing from the spirit and scope of the invention as defined by the appended claims.

What is claimed is:

1. A method for managing data flow in a network router comprising the steps of:
   receiving network data defining a set of communication destinations accessible by said network router over a particular route;
   partitioning said network data into first address data and second address data;
   storing said first address data in a first memory at a first storage address corresponding to a tree search format;
   storing said second address data in a second memory at second storage addresses, said second storage addresses is calculated from said first storage address and threshold data in said network data using a first algorithm;
   receiving a network data packet in said network router;
   comparing destination address data within said network data packet to said first address data to determine a match of a selected first number of bits of said destination address data to a corresponding same first number of sequential bits of said first address data;
   outputting a selected first storage address corresponding to said best match and corresponding selected threshold data stored in said first address data at said selected first storage address;
   calculating a selected second storage address from said selected first storage address and said selected threshold data using said first algorithm; and
   accessing said selected second storage address in said second memory and outputting a forwarding address for said network data packet stored within said selected second address data.

2. The method of claim 1, wherein said first address data comprises:
   destination address data defining sets of destinations accessible by said network router and said threshold data, said destinations accessible by an associated set of Next Hop addresses and said threshold data for use in selecting a particular Next Hop address from said associated set of Next Hop addresses.

3. The method of claim 2, wherein said second address data comprises:
   said associated set of said Next Hop addresses and a Border Gateway Protocol address.

4. The method of claim 1, wherein said first memory is static random access memory and said second memory is dynamic random access memory.

5. The method of claim 1, wherein said threshold data comprises Equal Cost Multi-Path threshold data.

6. The method of claim 1, wherein said first algorithm determines a particular second storage address from said first storage address and then determines which memory bank within said second storage address to access in response to an Equal Cost Multi-Path threshold within said network data packet.

7. The method of claim 1, wherein said best match is determined by a longest prefix mask that sets the number of bits of said destination address data that must compare to said first address data.

8. The method of claim 1, wherein said selected first storage address and said selected threshold data are used to calculate a corresponding selected second storage address from said second storage addresses.

9. The method of claim 1, wherein said forwarding address is a Next Hop address accessible by said network router that best routes said network data packet towards its final destination based on said network routers access connections and performance threshold data contained in said network data packet.

10. A network router for managing the flow of network data packets comprising:
    a circuit for connecting a selected input to a selected output corresponding to a communication path for a forwarding address of a next destination selected from a set of possible next destinations;
    a circuit for receiving network data defining communication connections accessible by said network router;
    a circuit for partitioning said network data into first address data and second address data;
    a circuit for storing said first address data in a first memory at a first storage address corresponding to a tree search format;
    a circuit for storing said second address data in a second memory at second storage addresses, said second storage addresses is calculated from said first storage address and threshold data using a first algorithm;
    a circuit for receiving an network data packet in said network router;
    a circuit for comparing destination address data within said network data packet to said first address data to determine a best match of a selected first number of bits of said destination address data to a corresponding same first number of sequential bits of said first address data;
    a circuit for outputting a selected first storage address corresponding to said best match and corresponding selected threshold data stored in said first address data at said selected first storage address;
    a circuit using said first algorithm to calculate a selected second storage address from said selected first storage address and said selected threshold data;
    a circuit for accessing said selected second storage address in said slower memory; and
    a circuit for outputting said forwarding address for said network data packet stored within said selected second address data.

11. The network router of claim 10, wherein said first address data comprises:
    destination address data defining sets of destinations accessible by said network router and said threshold data, said destinations accessible by an associated set of Next Hop addresses and said threshold data for use in selecting a particular Next Hop address from said associated set of Next Hop addresses.

12. The network router of claim 11, wherein said second address data comprises:
    said associated set of said Next Hop addresses and a Border Gateway Protocol address.

13. The network router of claim 10, wherein said first memory is static random access memory and said second memory is dynamic random access memory.

14. The network router of claim 10, wherein said threshold data comprises Equal Cost Multi-Path threshold data.

15. The network router of claim 10, wherein said first algorithm determines a particular second storage address from said first storage address and then determines which memory bank within said second storage address to access in response to an Equal Cost Multi-Path threshold within said network data packet.

16. A network router for managing the flow of network data packets comprising:
- a circuit for connecting a selected input to a selected output corresponding to a communication path for a forwarding address of a next destination selected from a set of possible next destinations;
- a circuit for receiving network data defining communication connections accessible by said network router;
- a circuit for partitioning said network data into first address data and second address data;
- a circuit for storing said first address data in a first memory at a first storage address corresponding to a tree search format;
- a circuit for storing said second address data in a second memory at second storage addresses, said second storage addresses is calculated from said first storage address and threshold data using a first algorithm;
- a circuit for receiving an network data packet in said network router;
- a circuit for comparing destination address data within said network data packet to said first address data to determine a best match of a selected first number of bits of said destination address data to a corresponding same first number of sequential bits of said first address data;
- a circuit for outputting a selected first storage address corresponding to said best match and corresponding selected threshold data stored in said first address data at said selected first storage address;
- a circuit using said first algorithm to calculate a selected second storage address from said selected first storage address and said selected threshold data;
- a circuit for accessing said selected second storage address in said slower memory; and
- a circuit for outputting said forwarding address for said network data packet stored within said selected second address data;
- wherein said best match is determined by a longest prefix mask that sets the number of bits of said destination address data that must compare to said first address data.

17. A network router for managing the flow of network data packets comprising:
- a circuit for connecting a selected input to a selected output corresponding to a communication path for a forwarding address of a next destination selected from a set of possible next destinations;
- a circuit for receiving network data defining communication connections accessible by said network router;
- a circuit for partitioning said network data into first address data and second address data;
- a circuit for storing said first address data in a first memory at a first storage address corresponding to a tree search format;
- a circuit for storing said second address data in a second memory at second storage addresses, said second storage addresses is calculated from said first storage address and threshold data using a first algorithm;
- a circuit for receiving an network data packet in said network router;
- a circuit for comparing destination address data within said network data packet to said first address data to determine a best match of a selected first number of bits of said destination address data to a corresponding same first number of sequential bits of said first address data;
- a circuit for outputting a selected first storage address corresponding to said best match and corresponding selected threshold data stored in said first address data at said selected first storage address;
- a circuit using said first algorithm to calculate a selected second storage address from said selected first storage address and said selected threshold data;
- a circuit for accessing said selected second storage address in said slower memory; and
- a circuit for outputting said forwarding address for said network data packet stored within said selected second address data;
- wherein said selected first storage address and said selected threshold data are used to calculate a corresponding selected second storage address from said second storage addresses.

18. A network router for managing the flow of network data packets comprising:
- a circuit for connecting a selected input to a selected output corresponding to a communication path for a forwarding address of a next destination selected from a set of possible next destinations;
- a circuit for receiving network data defining communication connections accessible by said network router;
- a circuit for partitioning said network data into first address data and second address data;
- a circuit for storing said first address data in a first memory at a first storage address corresponding to a tree search format;
- a circuit for storing said second address data in a second memory at second storage addresses, said second storage addresses is calculated from said first storage address and threshold data using a first algorithm;
- a circuit for receiving an network data packet in said network router;
- a circuit for comparing destination address data within said network data packet to said first address data to determine a best match of a selected first number of bits of said destination address data to a corresponding same first number of sequential bits of said first address data;
- a circuit for outputting a selected first storage address corresponding to said best match and corresponding selected threshold data stored in said first address data at said selected first storage address;
- a circuit using said first algorithm to calculate a selected second storage address from said selected first storage address and said selected threshold data;
- a circuit for accessing said selected second storage address in said slower memory; and
- a circuit for outputting said forwarding address for said network data packet stored within said selected second address data;
- wherein said forwarding address is a Next Hop address accessible by said network router that best routes said network data packet towards its final destination based on said network routers access connections and performance threshold data contained in said network data packet.

19. A network router for managing the flow of network data packets comprising:
- means for connecting a selected input to a selected output corresponding to a communication path for a forwarding address of a next destination selected from a set of possible next destinations;
- means for receiving network data defining communication connections accessible by said network router;
- means for partitioning said network data into first address data and second address data;
- means for storing said first address data in a first memory at a first storage address corresponding to a tree search format;
- means for storing said second address data in a second memory at second storage addresses, said second storage addresses is calculated from said first storage address and threshold data using a first algorithm;
- means for receiving an network data packet in said network router;
- means for comparing destination address data within said network data packet to said first address data to determine a best match of a selected first number of bits of said destination address data to a corresponding same first number of sequential bits of said first address data;
- means for outputting a selected first storage address corresponding to said best match and corresponding selected threshold data stored in said first address data at said selected first storage address;
- means using said first algorithm to calculate a selected second storage address from said selected first storage address and said selected threshold data;
- means for accessing said selected second storage address in said slower memory; and
- means for outputting said forwarding address for said network data packet stored within said selected second address data.

20. The network router of claim 19, wherein said first address data comprises:
- destination address data defining sets of destinations accessible by said network router and said threshold data, said destinations accessible by an associated set of Next Hop addresses and said threshold data for use in selecting a particular Next Hop address from said associated set of Next Hop addresses.

21. The network router of claim 20, wherein said second address data comprises:
- said associated set of said Next Hop addresses and a Border Gateway Protocol address.

* * * * *